United States Patent
Yoshida et al.

(10) Patent No.: US 11,289,885 B2
(45) Date of Patent: Mar. 29, 2022

(54) GAS-INSULATED SWITCHGEAR

(71) Applicant: Mitsubishi Electric Corporation, Tokyo (JP)

(72) Inventors: Tadahiro Yoshida, Tokyo (JP); Naoki Tanaka, Tokyo (JP); Masayuki Takebe, Tokyo (JP); Shintaro Kuroaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/045,790

(22) PCT Filed: Mar. 25, 2019

(86) PCT No.: PCT/JP2019/012339
§ 371 (c)(1),
(2) Date: Oct. 7, 2020

(87) PCT Pub. No.: WO2020/021769
PCT Pub. Date: Jan. 30, 2020

(65) Prior Publication Data
US 2021/0175691 A1    Jun. 10, 2021

(30) Foreign Application Priority Data

Jul. 24, 2018 (JP) ............................. JP2018-138164

(51) Int. Cl.
*H02B 13/035* (2006.01)
*H02B 13/045* (2006.01)
*H02B 5/06* (2006.01)

(52) U.S. Cl.
CPC ........... *H02B 13/0358* (2013.01); *H02B 5/06* (2013.01); *H02B 13/0352* (2013.01); *H02B 13/045* (2013.01)

(58) Field of Classification Search
CPC ............ H02B 13/0352; H02B 13/0358; H02B 13/045; H02B 5/06
See application file for complete search history.

(56) References Cited

U.S. PATENT DOCUMENTS

| | | | | |
|---|---|---|---|---|
| 2,760,033 A | * | 8/1956 | Carlg | H01H 33/02 218/101 |
| 3,073,891 A | * | 1/1963 | Barengoltz | H01F 27/04 174/161 R |

(Continued)

FOREIGN PATENT DOCUMENTS

| | | | | |
|---|---|---|---|---|
| CN | 204497572 U | * | 7/2015 | |
| DE | 3915699 A1 | * | 11/1990 | H02B 5/06 |

(Continued)

OTHER PUBLICATIONS

English translation of Tanimura, Japanese Publication No. 59-191812U dated Dec. 19, 1984, translation on Nov. 30, 2021 (Year: 2021).*

(Continued)

*Primary Examiner* — Robert J Hoffberg
(74) *Attorney, Agent, or Firm* — Buchanan Ingersoll & Rooney PC

(57) ABSTRACT

A bushing tank having power receiving lead-in bushings of three phases to which conductor portions extended rearward of a main body portion in which a switching device is housed are connected is included, and the power receiving lead-in bushings of the three phases are disposed at an upper surface portion of the bushing tank at equal intervals in a circumferential direction such that end portions thereof are inclined outward so as to be separated from each other, and one of the power receiving lead-in bushings of the three phases is disposed along a front-rear direction of the main body portion. Owing to this configuration, it is possible not only to ensure insulation distances between the end portions of the power receiving lead-in bushings but also to ensure (Continued)

insulation distances between lead-in wires regardless of a power receiving lead-in direction.

13 Claims, 10 Drawing Sheets

(56) References Cited

U.S. PATENT DOCUMENTS

| | | | | |
|---|---|---|---|---|
| 3,214,550 | A * | 10/1965 | Easley | H01H 33/16 |
| | | | | 218/58 |
| 3,335,245 | A * | 8/1967 | McCloud | H01H 33/55 |
| | | | | 218/101 |
| 4,045,634 | A * | 8/1977 | Nakano | H02B 5/06 |
| | | | | 218/75 |
| 6,686,553 | B1 * | 2/2004 | Meinherz | H02B 13/0352 |
| | | | | 218/120 |
| 6,771,489 | B2 * | 8/2004 | Marmonier | H02B 5/06 |
| | | | | 361/604 |
| 9,502,868 | B2 * | 11/2016 | Kagawa | H02B 5/06 |
| 10,355,460 | B2 * | 7/2019 | Whaley | H02B 1/24 |
| 2021/0143618 | A1 * | 5/2021 | Yoshida | H02B 13/035 |

FOREIGN PATENT DOCUMENTS

| | | | | |
|---|---|---|---|---|
| DE | 19626002 | A1 * | 1/1998 | ........... H02B 13/065 |
| JP | S54104021 | U | 7/1979 | |
| JP | S5930610 | U | 2/1984 | |
| JP | S5950516 | U | 4/1984 | |
| JP | S59191812 | U * | 12/1984 | |
| JP | S59191812 | U | 12/1984 | |
| JP | S6110407 | Y2 * | 3/1986 | |
| JP | H0574106 | U | 10/1993 | |
| JP | 2000232707 | A | 8/2000 | |

OTHER PUBLICATIONS

International Search Report (PCT/ISA/210), with translation, and Written Opinion (PCT/ISA/237) dated Jun. 25, 2019, by the Japan Patent Office as the International Searching Authority for International Application No. PCT/JP2019/012339.

Notice of Reasons for Refusal dated Apr. 14, 2020 by the Japan Patent Office for Application No. 2019-542643.

Notice of Reasons for Refusal dated Nov. 19, 2019 by the Japan Patent Office for Application No. 2019-542643.

* cited by examiner

GAS-INSULATED SWITCHGEAR

TECHNICAL FIELD

The present disclosure relates to a gas-insulated switchgear.

BACKGROUND ART

A gas-insulated switchgear installed in a substation or the like has a structure in which bushings of three phases, which are overhead wire power receiving parts, are attached to a container in which a circuit breaker, a disconnector, etc., are housed and that is filled with insulating gas. In a conventional structure, in order to ensure air insulation distances between the bushings of the three phases, the central bushing among the bushings aligned in a line is made high, and the bushings on both sides are inclined. However, arranging all the bushings of the three phases vertically, or attaching at least bushings of two phases to side surfaces of the container, in order to facilitate bushing installation and in order to increase earthquake-resistant strength, is disclosed (see Patent Document 1).

Moreover, a structure, in which a common attachment member for attaching bushings for the three phases to a container is used in order to facilitate the installation of the bushings and the bushings are inclined such that end portions of the bushings are spaced apart from each other in order to ensure insulation distances between the bushings of the three phases, is disclosed (see Patent Document 2).

CITATION LIST

Patent Document

Patent Document 1: Japanese Laid-Open Utility Model Publication No. 59-30610
Patent Document 2: Japanese Laid-Open Patent Publication No. 2000-232707

SUMMARY OF THE INVENTION

Problems to be Solved by the Invention

The conventional gas-insulated switchgear is formed as described above, and, for example, the bushings of the three phases aligned in a line are appropriately installed so as to face in a power receiving lead-in direction, and insulation distances are ensured between lead-in wires to the bushings of the three phases. However, if the power receiving lead-in direction is changed, insulation distances cannot be ensured with the bushing arrangement being unchanged in some cases, so that the structure of the overhead wire power receiving parts needs to be changed. Therefore, there is a problem that the power receiving lead-in direction cannot be easily changed.

Moreover, when the orientation of the gas-insulated switchgear is restricted at the installation location, there is a problem that it is necessary to design a bushing structure according to the installation orientation of the container and the power receiving lead-in direction each time the installation is made.

The present disclosure discloses a technology for solving the above-described problems, and an object of the present disclosure is to provide a gas-insulated switchgear having a bushing arrangement that can flexibly respond to a power receiving lead-in direction without changing a structure.

Solution to the Problems

A gas-insulated switchgear according to the present disclosure includes: a main body portion in which a switching device is housed; power receiving lead-in bushings of three phases to which conductor portions extended rearward from the main body portion are connected, respectively; and a bushing tank at which the power receiving lead-in bushings of the three phases are provided and in which insulating gas is sealed, wherein an upper surface portion of the bushing tank is formed as a hemispherical portion protruding upward, the power receiving lead-in bushings of the three phases are provided at the hemispherical portion, the power receiving lead-in bushings of the three phases are disposed on an upper surface of the bushing tank at equal intervals in a circumferential direction such that end portions thereof are inclined outward so as to be separated from each other, and one of the power receiving lead-in bushings of the three phases is disposed along a front-rear direction of the main body portion.

Effect of the Invention

In the gas-insulated switchgear according to the present disclosure, since the power receiving lead-in bushings of the three phases are disposed at equal intervals in the circumferential direction such that the end portions thereof are inclined outward so as to be separated from each other, and one of the bushings of the three phases is disposed along the front-rear direction of the main body portion in which the switching device is housed, it is possible to ensure insulation distances without depending on a power receiving lead-in direction, so that it is unnecessary to change the structure of the bushings.

DESCRIPTION OF EMBODIMENTS

Figure 1:
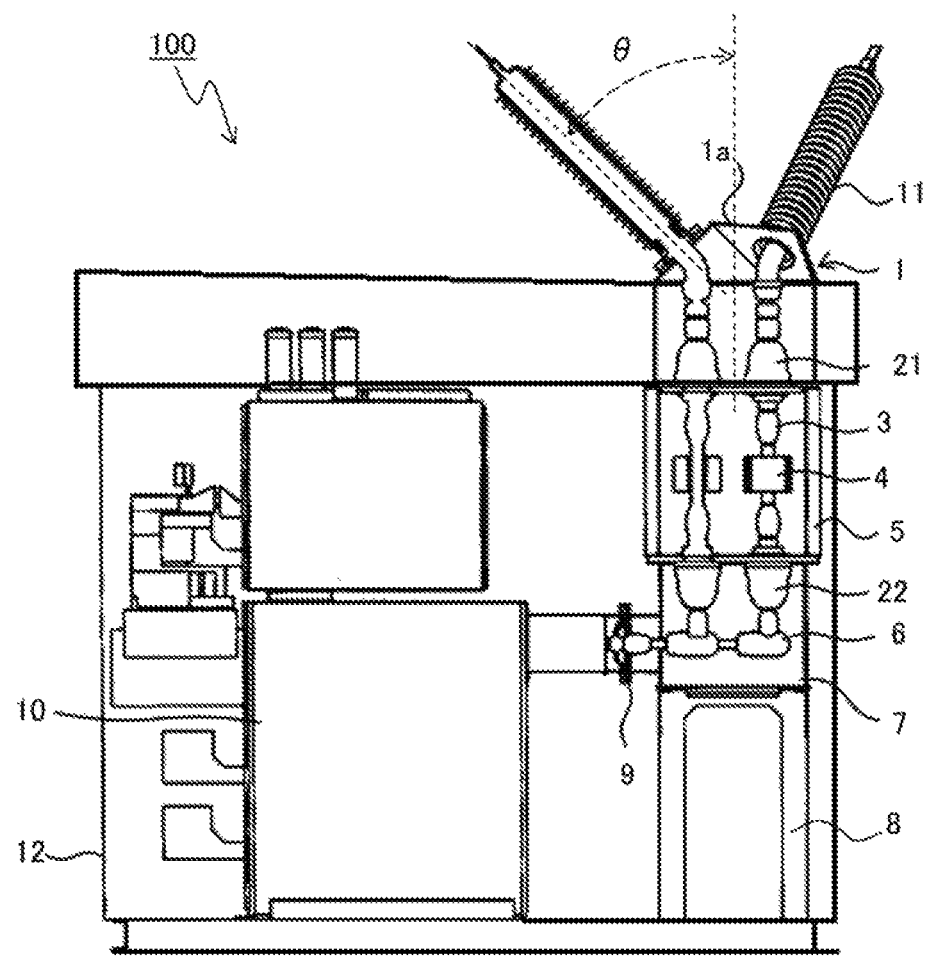
FIG. 1 is a side cross-sectional view of a gas-insulated switchgear according to Embodiment 1.

Hereinafter, embodiments will be described with reference to the drawings. In the respective drawings, the same reference characters denote the same or corresponding parts.

Embodiment 1

FIG. 1 is a side cross-sectional view of a gas-insulated switchgear according to Embodiment 1. The gas-insulated switchgear 100 includes, within a housing 12, a main body portion 10 in which a gas-insulated switching device (switching device) is housed, and conductor portions 6 extended from the main body portion 10 are connected via cables 3 to power receiving lead-in bushings 11 of three phases (denoted by 11 when described as representatives of 11a, 11b, and 11c) that receive power from the outside.

The gas-insulated switchgear 100 (C-GIS: cubicle type gas insulated switchgear) is a facility for power transmission and distribution and power reception, is used as, for example, a facility for a substation, and has an overhead wire power receiving structure. The gas-insulated switchgear 100 has a configuration in which the main body portion 10 (switching device) housed in the housing 12 is a main component, and a circuit breaker, a grounding switch, a disconnector, an arrester, an instrument transformer, an instrument current transformer, a voltage detector, etc., which are not shown, are integrated in a panel of the main body portion 10.

An intermediate tank 7 is provided to the rear of the main body portion 10 via a three-phase spacer 9, and a bushing tank 1 is disposed above the intermediate tank 7 via a cable chamber 5 in which the cables 3 are housed. The intermediate tank 7 is installed on a base frame 8.

Three conductor portions 6 for three phases extended horizontally from the main body portion 10 toward the depth side, that is, toward the rear side, extend upward in the vertical direction within the intermediate tank 7 via the three-phase spacer 9 and are connected to the power receiving lead-in bushings 11 via the cables 3.

In a three-chamber configuration of the intermediate tank 7, the cable chamber 5, and the bushing tank 1 through which the conductor portions 6 are guided to the power receiving lead-in bushings 11, when insulating gas is sealed in the intermediate tank 7 and the bushing tank 1, the insulating gas does not need to be sealed in the cable chamber 5. Therefore, in this structure, bushings 22 are provided as connection portions at an inner upper portion of the intermediate tank 7 in which the insulating gas is sealed, and the conductor portions 6 are connected to the cables 3 via the bushings 22. In addition, bushings 21 are provided as connection portions at an inner lower portion of the bushing tank 1, and the cables 3 are connected to the power receiving lead-in bushings 11 via the bushings 21.

The insulating gas is sealed in the bushing tank 1, and an upper surface portion 1a of the bushing tank 1 has a polyhedral structure for providing the power receiving lead-in bushings 11 protruding from the upper surface of the housing 12. The polyhedral structure is formed, for example, by welding flat plates so as to have surfaces with predetermined angles at an upper portion of the bushing tank 1 such that each power receiving lead-in bushing 11 is installed in a later-described predetermined direction so as to be inclined outward at a predetermined angle θ from the vertical direction.

Moreover, for example, a polymer bushing having an insulating structure in which the outer periphery of a conductor is covered with an epoxy resin, a silicone rubber, or the like is used as each power receiving lead-in bushing 11.

Since the insulating gas does not need to be sealed in the cable chamber 5 as described above, the cable chamber 5 may be a frame-shaped structure as long as the cables 3 can be housed while being exposed to the atmosphere or in an open space and the intermediate tank 7 and the bushing tank 1 can be supported. In addition, a current transformer 4 (CT) may be disposed at an intermediate position of each cable 3.

Figure 2:
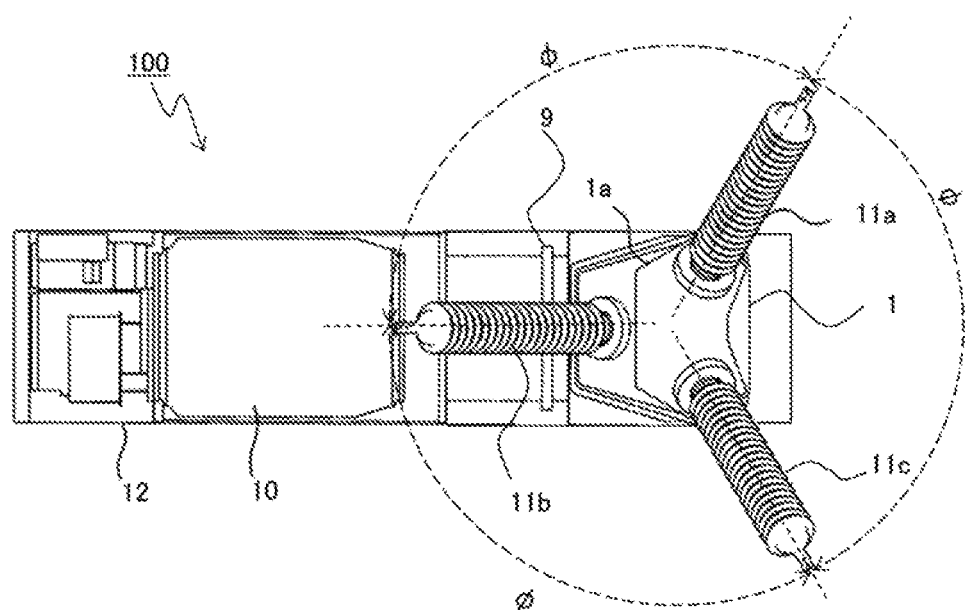
FIG. 2 is a top view of the gas-insulated switchgear according to Embodiment 1.

FIG. 2 is a top view of the gas-insulated switchgear 100. In FIG. 2, the inside of the housing 12 is also transparently shown such that an outline thereof can be seen. The power receiving lead-in bushings 11a, 11b, and 11c of the three phases are disposed at the polyhedral structure of the upper surface portion 1a of the bushing tank 1 such that angles φ between the adjacent bushings are equal (substantially 120 degrees), and are disposed such that upper end portions thereof are inclined outward at a predetermined angle so as to be separated from each other. The one power receiving lead-in bushing 11b among the three phases is disposed in a direction along the front-rear direction of the main body portion 10 of the gas-insulated switchgear 100 so as to be inclined frontward. When the power receiving lead-in bushing 11b is disposed in this manner, the other two power receiving lead-in bushings 11a and 11c protrude from the housing 12 portion rearward in the depth direction by a smaller amount, so that the dimension in the depth direction of the gas-insulated switchgear 100 as an apparatus becomes the smallest. This is advantageous, for example, when the installation location of the gas-insulated switchgear 100 is limited.

Figure 3:
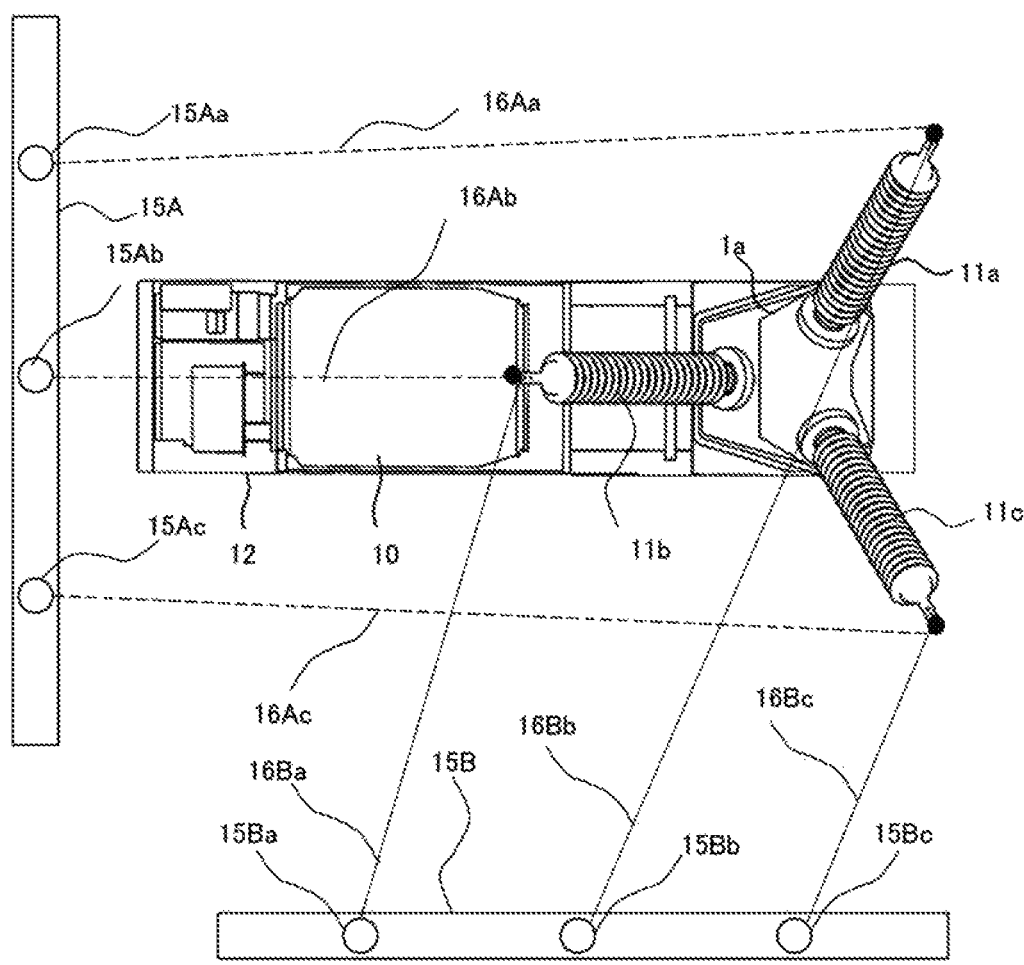
FIG. 3 is a diagram showing power receiving lead-in directions of power receiving lead-in bushings in FIG. 2.

FIG. 3 is a diagram showing power receiving lead-in directions of the power receiving lead-in bushings 11a, 11b, and 11c of the three phases in FIG. 2, and illustrates a positional relationship with a power transmission line lead-in tower. The drawing shows an example in which two power transmission line lead-in towers 15A and 15B are disposed in different directions.

First, a relationship between the power transmission line lead-in tower 15A and the power receiving lead-in bushings 11a, 11b, and 11c of the three phases will be described. A power transmitting portion 15Aa of the power transmission line lead-in tower 15A and a power receiving end portion of the power receiving lead-in bushing 11a are connected by a lead-in wire 16Aa, a power transmitting portion 15Ab of the power transmission line lead-in tower 15A and a power receiving end portion of the power receiving lead-in bushing 11b are connected by a lead-in wire 16Ab, and a power transmitting portion 15Ac of the power transmission line lead-in tower 15A and a power receiving end portion of the power receiving lead-in bushing 11c are connected by a lead-in wire 16Ac.

In this case, the lead-in wires 16Aa, 16Ab, and 16Ac can ensure insulation distances therebetween.

Next, a relationship between the power transmission line lead-in tower 15B and the power receiving lead-in bushings 11a, 11b, and 11c of the three phases will be described. A power transmitting portion 15Ba of the power transmission line lead-in tower 15B and the power receiving end portion of the power receiving lead-in bushing 11b are connected by a lead-in wire 16Ba, a power transmitting portion 15Bb of the power transmission line lead-in tower 15B and the power receiving end portion of the power receiving lead-in bushing 11a are connected by a lead-in wire 16Bb, and a power transmitting portion 15Bc of the power transmission line lead-in tower 15B and the power receiving end portion of the power receiving lead-in bushing 11c are connected by a lead-in wire 16Bc.

In this case as well, the lead-in wires 16Ba, 16Bb, and 16Bc can ensure insulation distances therebetween.

Regarding conventional power receiving lead-in bushings of three phases that are aligned in a line or that are aligned in a line such that only end portions thereof are spaced apart from each other, three lead-in wires through which power is received from the direction in which the bushings are aligned are close to each other, so that it is difficult to ensure insulation distances between the lead-in wires. Therefore, it is necessary to rotate the gas-insulated switchgear by 90 degrees and install the gas-insulated switchgear such that the ends of the bushings face power transmitting portions (face in the power receiving lead-in direction), thereby ensuring insulation distances between the lead-in wires.

However, in the present embodiment, the power receiving lead-in bushings 11a, 11b, and 11c are disposed at the upper portion of the bushing tank 1 evenly at intervals of 120 degrees in the circumferential direction so as to be inclined outward relative to each other, so that the end portions of the bushings of the three phases are not aligned in a line. It is possible to ensure insulation distances between the lead-in wires, except for the case where there is a power transmitting portion on an extension in the direction connecting power receiving lead-in bushings of two phases among the power receiving lead-in bushings of the three phases. In addition, also in the case where there is a power transmitting portion on an extension in the direction connecting two phases among the three phases, it is possible to ensure insulation distances between the lead-in wires when adjustment such as rotating the gas-insulated switchgear or the power transmitting portions by about 10 to 20 degrees is performed.

In the above, the example in which the power transmission line lead-in towers are present in two different directions, that is, the power receiving lead-in directions are different, has been described, but, in the present embodiment, it is possible to ensure insulation distances between the lead-in wires and receive power, almost without depending on the positions of the power transmission line lead-in towers, or without depending on the positions of the power transmission line lead-in towers by merely rotating the gas-insulated switchgear or the power transmitting portions by about 10 to 20 degrees. Even when the gas-insulated switchgear 100 is installed at a location where an installation space is limited, it is possible to receive power without considering the directions of the power transmission line lead-in towers. Moreover, even when the positional relationship with the power transmission line lead-in tower is changed, that is, the power receiving lead-in direction is changed, it is possible to ensure insulation distances between the lead-in wires and receive power.

Next, the inclination angle θ of each power receiving lead-in bushing 11 from the vertical direction will be described.

As described above, when the power receiving lead-in bushings 11a, 11b, and 11c of the three phases are inclined further outward in the direction in which the power receiving lead-in bushings 11a, 11b, and 11c of the three phases are separated from each other, it is easier to ensure insulation distances between the lead-in wires. However, when the inclination angle θ exceeds 45 degrees and approaches 90 degrees, it is necessary to ensure insulation distances between the power receiving lead-in bushings 11a, 11b, and 11c and the upper surface of the housing 12. Furthermore, the power receiving lead-in bushings 11a, 11b, and 11c of the three phases are opened outward, so that the size of the gas-insulated switchgear 100 as an apparatus is increased.

On the other hand, when the inclination angle θ is decreased, it is easier to ensure insulation distances between the power receiving lead-in bushings 11a, 11b, and 11c and the upper surface of the housing 12, and the size of the gas-insulated switchgear 100 as an apparatus is also reduced. However, it is difficult to ensure insulation distances between the lead-in wires depending on the positional relationships with the power transmission line lead-in towers, or it is necessary to install the gas-insulated switchgear 100 in consideration of the positional relationships with the power transmission line lead-in towers.

Therefore, the inclination angle θ is preferably in a range of 30 to 60 degrees and is most preferably about 45 degrees (45±5 degrees, that is, 40 to 50 degrees) as shown in FIG. 1. In addition, the inclination angles of the power receiving lead-in bushings 11a, 11b, and 11c of the three phases are preferably equal to each other.

Figure 4:
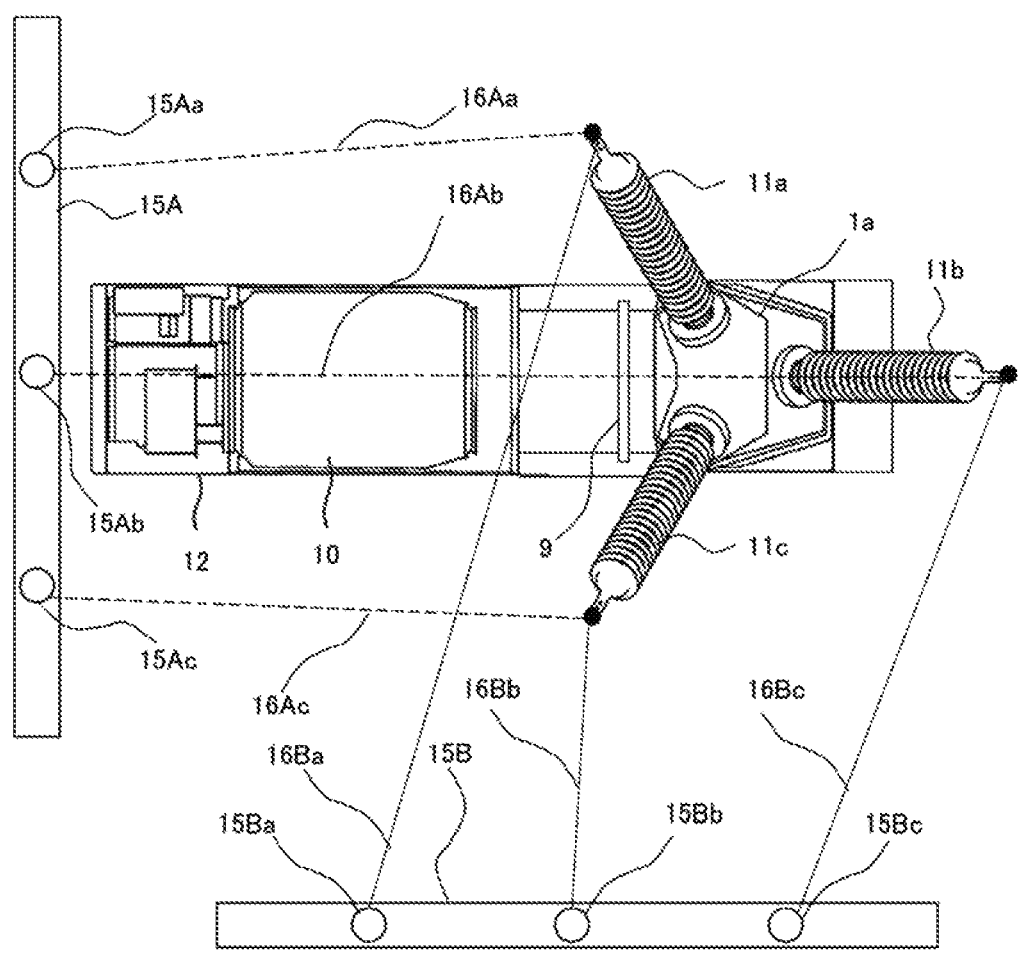
FIG. 4 is a top view of another gas-insulated switchgear according to Embodiment 1, showing power receiving lead-in directions of power receiving lead-in bushings.

FIG. 4 is a top view of another gas-insulated switchgear according to Embodiment 1, showing the power receiving lead-in directions of the power receiving lead-in bushings 11a, 11b, and 11c. Similar to FIG. 3, the power receiving lead-in bushings 11a, 11b, and 11c of the three phases are disposed at the polyhedral structure of the upper surface portion 1a of the bushing tank 1 such that the angles therebetween are equal (substantially 120 degrees) and the upper end portions thereof are inclined outward so as to be separated from each other. The difference from FIG. 3 is that the one power receiving lead-in bushing 11b among the three phases is disposed in the direction along the front-rear direction of the main body portion 10 of the gas-insulated switchgear 100 so as to be inclined in the rearward direction. When the bushings are disposed as described above, there is no installed object on an upper portion of the housing 12, so that work can also be performed on the upper surface during maintenance of the apparatus, which is convenient.

Similar to the case of FIG. 3, regarding power reception from the position of the power transmission line lead-in tower 15A, the lead-in wires 16Aa, 16Ab, and 16Ac can ensure insulation distances therebetween, and, regarding power reception from the position of the power transmission line lead-in tower 15B, the lead-in wires 16Ba, 16Bb, and 16Bc can ensure insulation distances therebetween. That is, the same advantageous effects as those in FIG. 3 can be obtained.

The three-chamber configuration of the intermediate tank 7, the cable chamber 5, and the bushing tank 1 through which the conductor portions 6 are guided to the power receiving lead-in bushings 11 is not limited to the above. These components may be integrated and the insulating gas may be sealed therein. In addition, for example, the cable chamber 5 and the bushing tank 1 may be integrated to form a two-chamber configuration, or the intermediate tank 7 and the cable chamber 5 may be integrated to form a two-chamber configuration.

Figure 5:
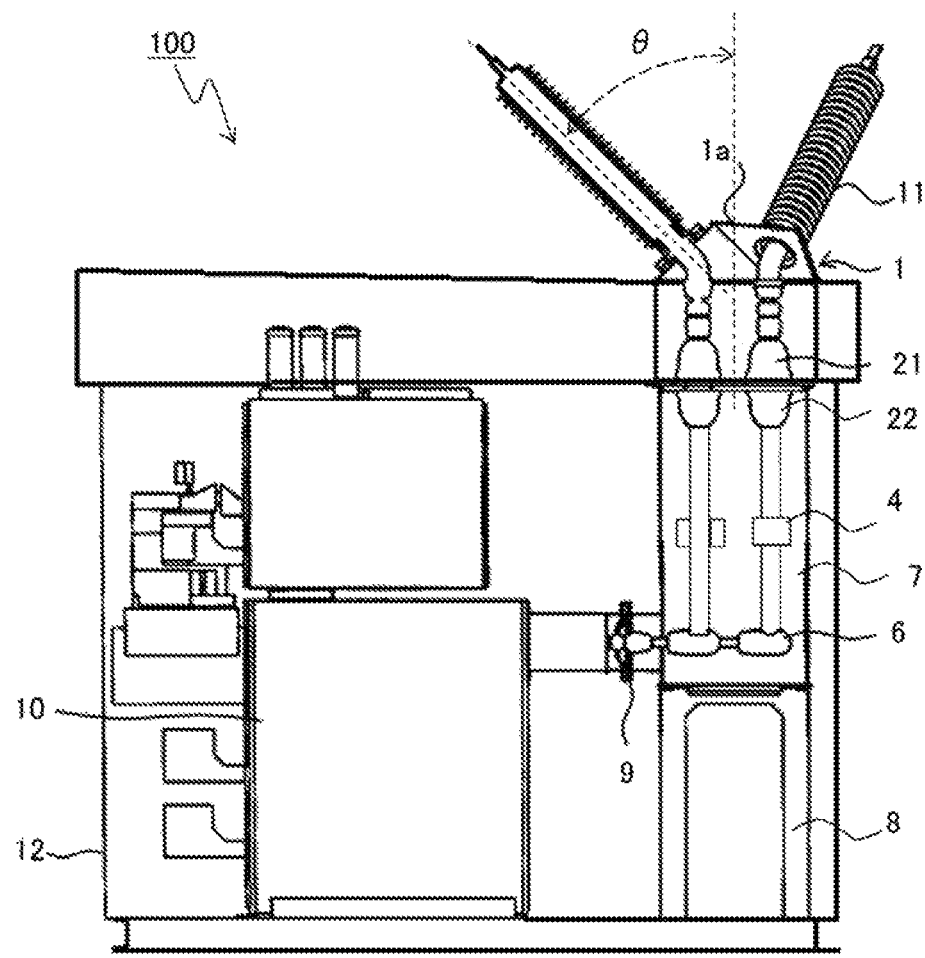
FIG. 5 is a side cross-sectional view of still another gas-insulated switchgear according to Embodiment 1.

FIG. 5 is a side cross-sectional view of still another gas-insulated switchgear 100 according to Embodiment 1. This example is an example of a structure in which a cable chamber is not included. The conductor portions 6 extended from the main body portion 10 are extended upward in the intermediate tank 7, and are connected to the bushings 21 in the bushing tank 1 via the bushings 22, which are connection portions, at the upper portion of the intermediate tank 7. The configuration in which the conductor portions 6 are guided to the power receiving lead-in bushings 11 may be changed as described above.

Figure 6:
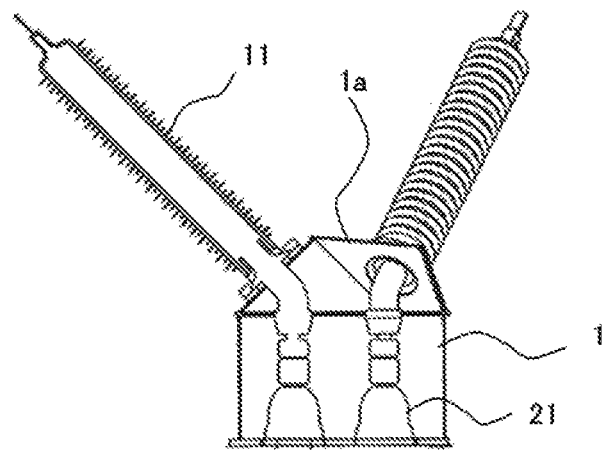
FIG. 6 is a diagram in which a bushing tank part in FIG. 1 is separated.

At least when the cable chamber 5 is exposed to the atmosphere or an open space and the bushing tank 1 and the cable chamber 5 can be configured so as to be separable from each other, work for attaching and detaching the cables 3 to the bushings 22 in the bushing tank 1 is work performed in the open space. Therefore, it is possible to separate a portion protruding from the housing 12, as shown in FIG. 6, and to transport the separated portion.

As described above, in Embodiment 1, it is possible not only to ensure insulation distances between the end portions of the power receiving lead-in bushings 11a, 11b, and 11c of the three phases but also to ensure insulation distances between the lead-in wires regardless of the power receiving lead-in directions. That is, it is possible to provide the gas-insulated switchgear 100 as a versatile apparatus for which a structure change does not have to be made for each power receiving lead-in direction. Furthermore, quality improvement, reliability improvement, and cost reduction are achieved.

Embodiment 2

Although the example in which the upper surface portion 1a of the bushing tank 1 is the polyhedral structure has been described in Embodiment 1, an example with a hemispherical structure will be described in Embodiment 2.

Figure 7:
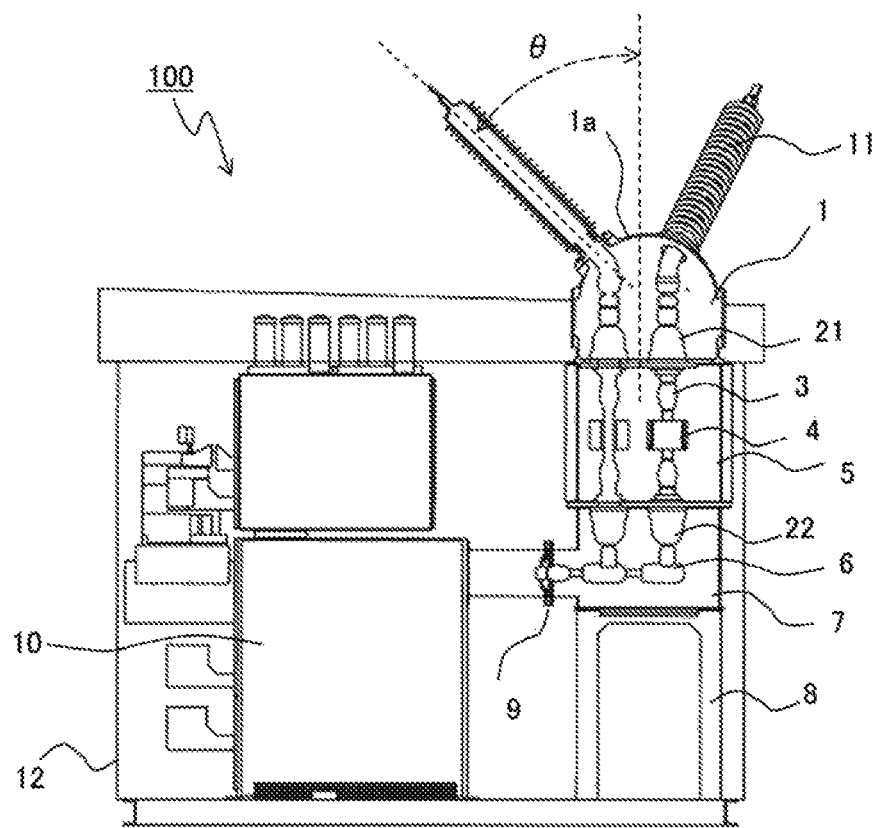
FIG. 7 is a side cross-sectional view of a gas-insulated switchgear according to Embodiment 2.

FIG. 7 is a side cross-sectional view of a gas-insulated switchgear 100 according to Embodiment 2. In the drawing, the difference from FIG. 1 of Embodiment 1 is that the upper surface portion 1a of the bushing tank 1 is formed as a hemispherical structure. The other parts are the same as in FIG. 1 of Embodiment 1, and thus the description thereof is omitted.

Each power receiving lead-in bushing 11 is installed at the upper surface portion 1a of the bushing tank 1, which is formed as a hemispherical structure, in the predetermined direction described above in Embodiment 1 so as to be inclined outward at a predetermined angle θ from the vertical direction. The hemispherical structure can be accurately produced, for example, by casting with a die.

When the upper surface portion 1a of the bushing tank 1 is formed as a hemispherical structure, it is easier to dispose each power receiving lead-in bushing 11 at a predetermined angle in a predetermined arrangement than with a polyhedral structure, and the bushing tank can be produced with high accuracy. In addition, a thicker structure can be produced than by welding of flat plates or the like, and the strength can also be increased.

Figure 8:
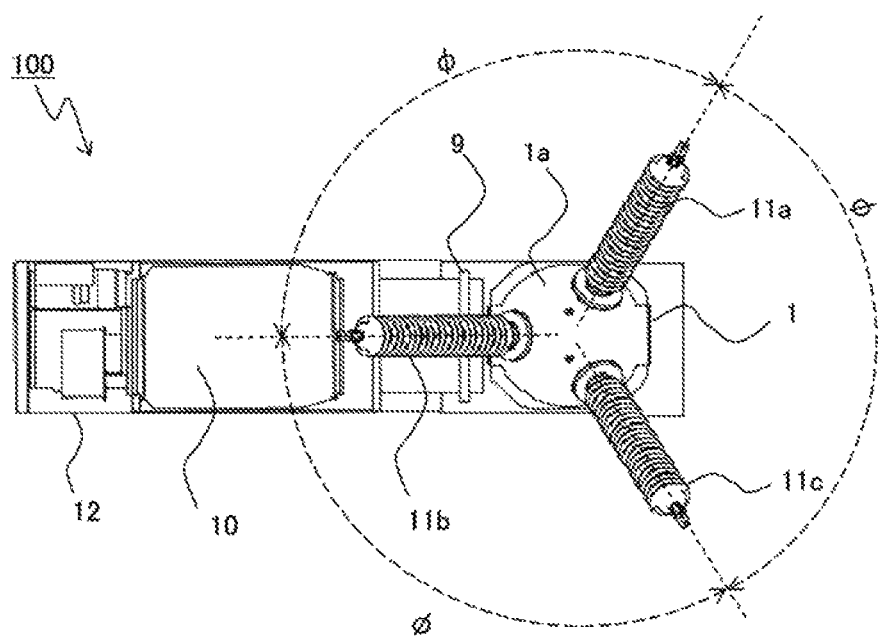
FIG. 8 is a top view of the gas-insulated switchgear according to Embodiment 2.

FIG. 8 is a top view of the gas-insulated switchgear 100 in FIG. 7. Similar to FIG. 2, the power receiving lead-in bushings 11a, 11b, and 11c of the three phases are disposed at the hemispherical structure of the upper surface portion 1a of the bushing tank 1 such that angles φ between the adjacent bushings are equal (substantially 120 degrees), and are disposed such that upper end portions thereof are inclined outward so as to be separated from each other. The one power receiving lead-in bushing 11b among the three phases is disposed in a direction along the front-rear direction of the main body portion 10 of the gas-insulated switchgear 100 so as to be inclined frontward.

Figure 9:
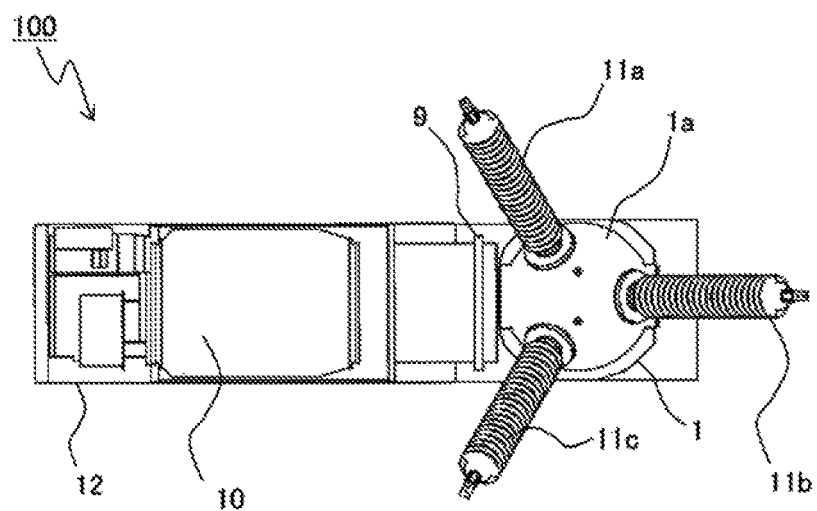
FIG. 9 is a top view of another gas-insulated switchgear according to Embodiment 2.

FIG. 9 is a top view of another gas-insulated switchgear according to Embodiment 2, showing the power receiving lead-in directions of the power receiving lead-in bushings 11a, 11b, and 11c. Similar to FIG. 8, the power receiving lead-in bushings 11a, 11b, and 11c of the three phases are disposed at the hemispherical structure of the upper surface portion 1a of the bushing tank 1 such that angles therebetween are equal (substantially 120 degrees) and the upper end portions thereof are inclined outward so as to be separated from each other. The difference from FIG. 8 is that the one power receiving lead-in bushing 11b among the three phases is disposed in the direction along the front-rear direction of the main body portion 10 of the gas-insulated switchgear 100 so as to be inclined in the rearward direction. This gas-insulated switchgear corresponds to a gas-insulated switchgear obtained when the upper surface portion 1a of the bushing tank 1 in FIG. 4 is formed as a hemispherical structure.

Figure 10:
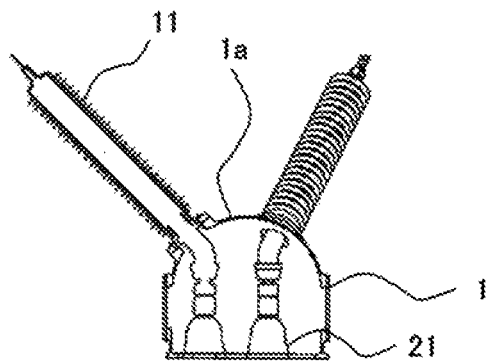
FIG. 10 is a diagram in which a bushing tank part in FIG. 7 is separated.

FIG. 10 is a side cross-sectional view of the bushing tank 1 in FIG. 7, showing a state where the bushing tank 1 is separated from the cable chamber 5. The three-chamber configuration of the intermediate tank 7, the cable chamber 5, and the bushing tank 1 through which the conductor portions 6 are guided to the power receiving lead-in bushings 11 is not limited to the above. However, as described with reference to FIG. 6 of Embodiment 1, at least when the cable chamber 5 is exposed to the atmosphere or an open space and the bushing tank 1 and the cable chamber 5 can be configured so as to be separable from each other, work for attaching and detaching the cables 3 to the bushings 21 in the bushing tank 1 is work performed in the open space. Therefore, it is possible to separate a portion protruding from the housing 12 and to transport the separated portion.

As described above, in Embodiment 2, similar to Embodiment 1, it is possible not only to ensure insulation distances between the end portions of the respective power receiving lead-in bushings 11a, 11b, and 11c of the three phases but also to ensure insulation distances between the lead-in wires regardless of the power receiving lead-in directions. That is, it is possible to provide the gas-insulated switchgear 100 as a versatile apparatus for which a structure change does not have to be made for each power receiving lead-in direction. Moreover, quality improvement, reliability improvement, and cost reduction are achieved. Furthermore, since the upper surface portion 1a of the bushing tank 1 is formed as a hemispherical structure, it is possible to produce a bushing tank with high accuracy and high strength.

Embodiment 3

Although the example, in which the intermediate tank 7, the cable chamber 5, and the bushing tank 1 through which the conductor portions 6 extended from the main body portion 10 are guided to the power receiving lead-in bushings 11 are housed in the housing 12, is shown in Embodiments 1 and 2 described above, these components may be connected outside the housing.

Figure 11:
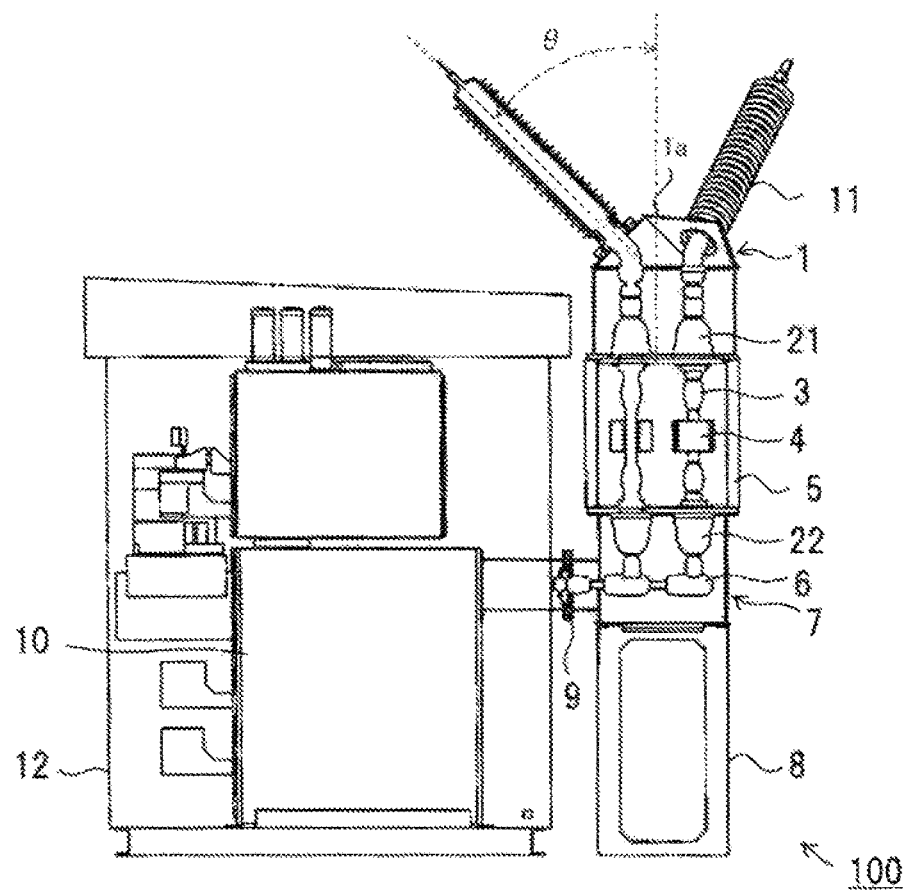
FIG. 11 is a side cross-sectional view of a gas-insulated switchgear according to Embodiment 3.

FIG. 11 is a side cross-sectional view of a gas-insulated switchgear 100 according to Embodiment 3. In the drawing, the difference from FIG. 1 of Embodiment 1 is that components disposed to the rear of the main body portion 10 are disposed outside the housing 12. That is, the intermediate tank 7 in which the insulating gas is sealed is provided via the three-phase spacer 9, and the bushing tank 1 in which the insulating gas is sealed is disposed above the intermediate tank 7 via the cable chamber 5 in which the cables 3 are housed. These components are disposed outside the housing 12. The intermediate tank 7 is installed on the base frame 8.

The other parts are the same as in FIG. 1 of Embodiment 1, and thus the description thereof is omitted.

The three-chamber configuration of the intermediate tank 7, the cable chamber 5, and the bushing tank 1 through which the conductor portions 6 are guided to the power receiving lead-in bushings 11 is not limited to the above. These components may be integrated and the insulating gas may be sealed therein. In addition, for example, the cable chamber 5 and the bushing tank 1 may be integrated to form a two-chamber configuration, or the intermediate tank 7 and the cable chamber 5 may be integrated to form a two-chamber configuration.

At least when the cable chamber 5 is exposed to the atmosphere or an open space and the bushing tank 1 and the cable chamber 5 can be configured so as to be separable from each other, work for attaching and detaching the cables 3 to the bushings 21 in the bushing tank 1 is work performed in the open space. Therefore, it is possible to separate a portion protruding from the housing 12, as shown in FIG. 6 of Embodiment 1, and to transport the separated portion.

Figure 12:
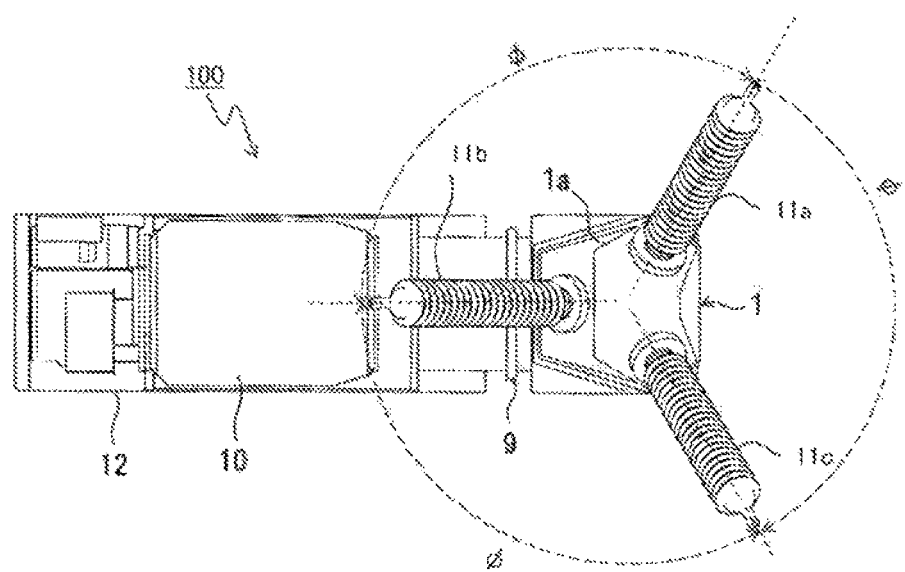
FIG. 12 is a top view of the gas-insulated switchgear according to Embodiment 3.

FIG. 12 is a top view of the gas-insulated switchgear 100 in FIG. 11. Similar to FIG. 2, the power receiving lead-in bushings 11a, 11b, and 11c of the three phases are disposed at the polyhedral structure of the upper surface portion 1a of the bushing tank 1 such that angles φ between the adjacent bushings are equal (substantially 120 degrees), and are disposed such that upper end portions thereof are inclined outward at a predetermined angle θ so as to be separated from each other. The one power receiving lead-in bushing 11b among the three phases is disposed in a direction along the front-rear direction of the main body portion 10 of the gas-insulated switchgear 100 so as to be inclined in the frontward direction.

Figure 13:
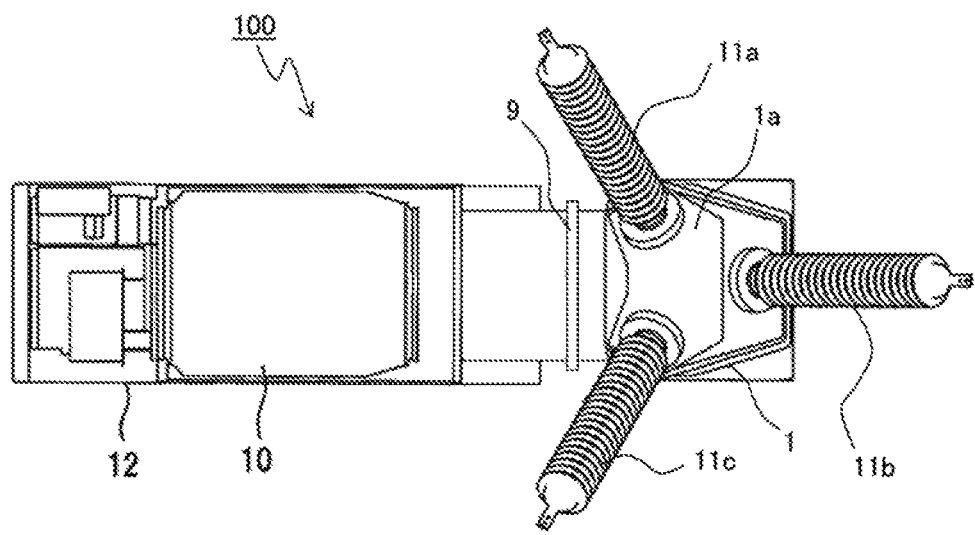
FIG. 13 is a top view of another gas-insulated switchgear according to Embodiment 3.

FIG. 13 is a top view of another gas-insulated switchgear according to Embodiment 3, showing the power receiving lead-in directions of the power receiving lead-in bushings 11a, 11b, and 11c. Similar to FIG. 12, the power receiving lead-in bushings 11a, 11b, and 11c of the three phases are disposed at the polyhedral structure of the upper surface portion 1a of the bushing tank 1 such that angles therebetween are equal (substantially 120 degrees) and the upper end portions thereof are inclined outward at a predetermined angle θ so as to be separated from each other. The difference from FIG. 12 is that the one power receiving lead-in bushing 11b among the three phases is disposed in the direction along the front-rear direction of the main body portion 10 of the gas-insulated switchgear 100 so as to be inclined in the rearward direction. This gas-insulated switchgear corresponds to a gas-insulated switchgear obtained when the bushing tank 1, etc., in FIG. 4 are disposed outside the housing 12.

As described above, in Embodiment 3, similar to Embodiment 1, it is possible not only to ensure insulation distances between the end portions of the respective power receiving lead-in bushings 11a, 11b, and 11c of the three phases but also to ensure insulation distances between the lead-in wires regardless of the power receiving lead-in directions. That is, it is possible to provide the gas-insulated switchgear 100 as a versatile apparatus for which a structure change does not have to be made for each power receiving lead-in direction. Moreover, quality improvement, reliability improvement, and cost reduction are achieved.

Furthermore, by making the cable chamber to be exposed to the atmosphere or to be an open space, it is possible to separate the bushing tank 1, on which the respective power receiving lead-in bushings 11 of the three phases are mounted, from the cable chamber, which is connected to the bushing tank 1, and to transport the separated bushing tank 1. In addition, since the intermediate tank 7 and the cable chamber 5 in which the conductor portions 6 extended from the main body portion 10 in the housing 12 are housed are also located outside the housing 12, workability of reassembling after transportation is also improved.

Embodiment 4

In Embodiment 4, similar to Embodiment 2, an example in which the upper surface portion 1a of the bushing tank 1 is formed as a hemispherical structure will be described.

Figure 14:
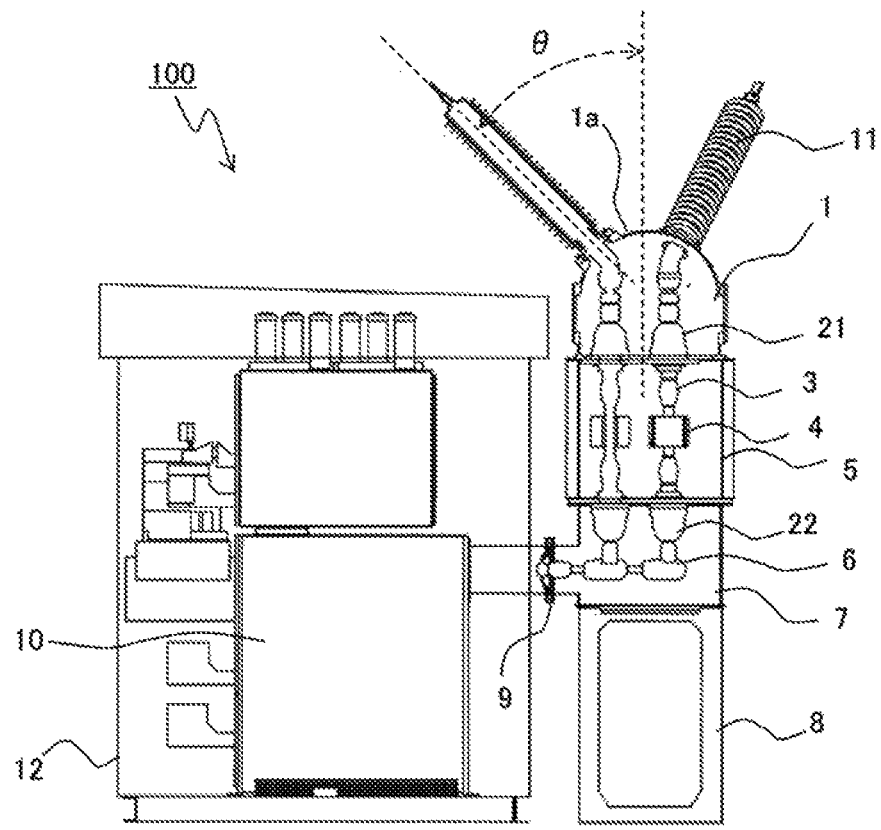
FIG. 14 is a side cross-sectional view of a gas-insulated switchgear according to Embodiment 4.

FIG. 14 is a side cross-sectional view of a gas-insulated switchgear 100 according to Embodiment 4. In the drawing, the difference from Embodiment 3 is that the upper surface portion 1a of the bushing tank 1 is formed as a hemispherical structure. The other parts are the same as in Embodiment 3, and thus the description thereof is omitted.

Each power receiving lead-in bushing 11 is installed at the upper surface portion 1a of the bushing tank 1, which is formed as a hemispherical structure, in the predetermined direction described above so as to be inclined outward at a predetermined angle θ from the vertical direction. The hemispherical structure can be accurately produced, for example, by casting with a die.

When the upper surface portion 1a of the bushing tank 1 is formed as a hemispherical structure by casting, it is easier to dispose each power receiving lead-in bushing 11 at a predetermined angle in a predetermined arrangement than with a polyhedral structure, and the bushing tank can be produced with high accuracy. In addition, when formed as a hemispherical structure, its pressure-resistant structure is superior to that of a polyhedral structure, so that the structure can be made thinner to be reduced in weight.

Figure 15:
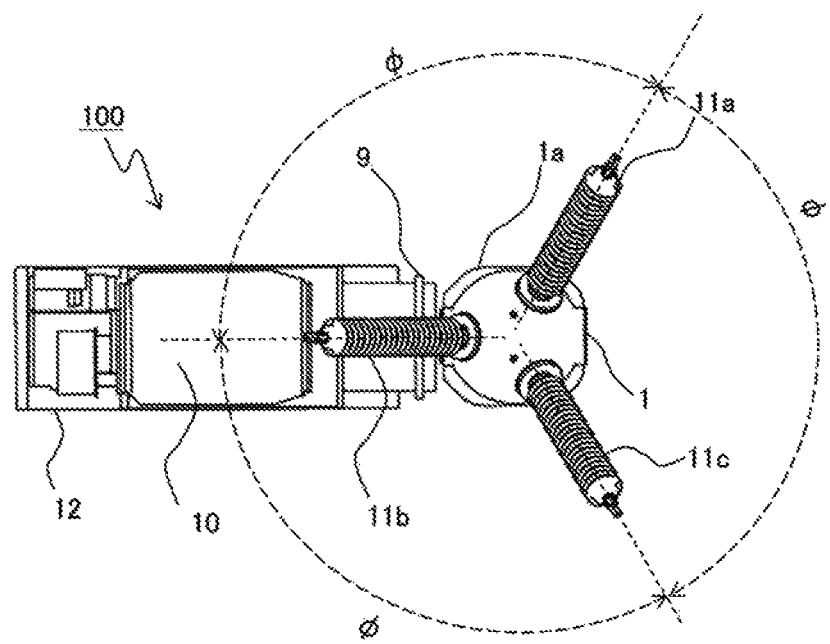
FIG. 15 is a top view of the gas-insulated switchgear according to Embodiment 4.

FIG. 15 is a top view of the gas-insulated switchgear 100 in FIG. 14. Similar to FIG. 12, the power receiving lead-in bushings 11a, 11b, and 11c of the three phases are disposed at the hemispherical structure of the upper surface portion 1a of the bushing tank 1 such that angles φ between the adjacent bushings are equal (substantially 120 degrees), and are disposed such that upper end portions thereof are inclined outward at a predetermined angle θ so as to be separated from each other. The one power receiving lead-in bushing 11b among the three phases is disposed in a direction along the front-rear direction of the main body portion 10 of the gas-insulated switchgear 100 so as to be inclined in the frontward direction.

Figure 16:
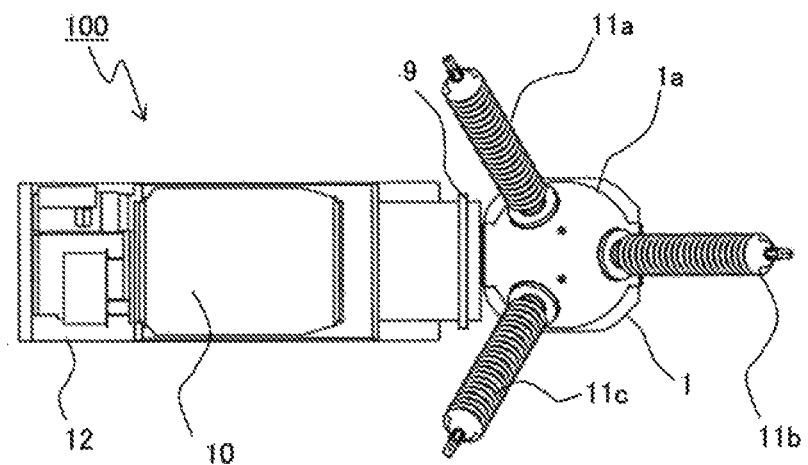
FIG. 16 is a top view of another gas-insulated switchgear according to Embodiment 4.

FIG. 16 is a top view of another gas-insulated switchgear according to Embodiment 4, showing the power receiving lead-in directions of the power receiving lead-in bushings 11a, 11b, and 11c. Similar to FIG. 15, the power receiving lead-in bushings 11a, 11b, and 11c of the three phases are disposed at the hemispherical structure of the upper surface portion 1a of the bushing tank 1 such that angles therebetween are equal (substantially 120 degrees) and the upper end portions thereof are inclined outward at a predetermined angle θ so as to be separated from each other. The difference from FIG. 15 is that the one power receiving lead-in bushing 11b among the three phases is disposed in the direction along the front-rear direction of the main body portion 10 of the gas-insulated switchgear 100 so as to be inclined in the rearward direction. In addition, this gas-insulated switchgear corresponds to a gas-insulated switchgear obtained when the upper surface portion 1a of the bushing tank 1 in FIG. 13 is formed as a hemispherical structure.

As described above, in Embodiment 4, the same advantageous effects as those in Embodiments 1 to 3 are achieved. That is, it is possible not only to ensure insulation distances between the end portions of the respective power receiving lead-in bushings 11a, 11b, and 11c of the three phases but also to ensure insulation distances between the lead-in wires regardless of the power receiving lead-in directions. It is possible to provide the gas-insulated switchgear 100 as a versatile apparatus for which a structure change does not have to be made for each power receiving lead-in direction. Moreover, quality improvement, reliability improvement, and cost reduction are achieved. Furthermore, since the upper surface portion 1a of the bushing tank 1 is formed as a hemispherical structure, it is possible to produce a bushing tank with high accuracy and high strength.

Furthermore, by making the cable chamber 5 to be exposed to the atmosphere or to be an open space, it is possible to separate the bushing tank 1, on which the respective power receiving lead-in bushings 11 of the three phases are mounted, from the cable chamber, which is connected to the bushing tank 1, and to transport the separated bushing tank 1. In addition, since the intermediate tank 7 and the cable chamber 5 in which the conductor portions 6 extended from the main body portion 10 in the housing 12 are housed are also located outside the housing 12, workability of reassembling after transportation is also improved.

Although the present disclosure is described above in terms of various exemplary embodiments and examples, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 bushing tank
1a upper surface portion
3 cable
4 current transformer
5 cable chamber
6 conductor portion
7 intermediate tank
8 base frame
9 three-phase spacer
10 main body portion
11, 11a, 11b, 11c power receiving lead-in bushing
12 housing
15A power transmission line lead-in tower
15Aa, 15Ab, 15Ac power transmitting portion
15B power transmission line lead-in tower
15Ba, 15Bb, 15Bc power transmitting portion
16Aa, 16Ab, 16Ac, 16Ba, 16Bb, 16Bc lead-in wire
21, 22 bushing
100 gas-insulated switchgear

The invention claimed is:
1. A gas-insulated switchgear, comprising:
a main body portion in which a switching device is housed, the main body portion having a front end and a rear end;
power receiving lead-in bushings of three phases to which conductor portions, arranged rearward of the main body portion, are connected, respectively;
a bushing tank at which the power receiving lead-in bushings of the three phases are provided and in which a first insulating gas is sealed, bushing tank connection portions which are provided in the bushing tank and to which the power receiving lead-in bushings of the three phases are connected; and
an intermediate tank which is provided rearward of the main body portion, through which the conductor portions extended from the main body portion are extended in which a second insulating gas is sealed, and which has intermediate tank connection portions to which end portions of the conductor portions are connected, wherein
the power receiving lead-in bushings of the three phases are disposed on an upper surface portion of the bushing tank at equal intervals in a circumferential direction such that an end portion of each of the power receiving lead-in bushings is inclined outward so as to be separated from each other, and one of the power receiving lead-in bushings of the three phases is disposed along a front-rear direction of the main body portion, and
the bushing tank connection portions and the intermediate tank connection portions are connected by cables.

2. The gas-insulated switchgear according to claim 1, wherein the intermediate tank connection portions and the bushing tank connection portions are connected to the cables in an open space.

3. The gas-insulated switchgear according to claim 2, wherein the main body portion is housed in a housing, and the intermediate tank and the bushing tank are disposed outside the housing.

4. The gas-insulated switchgear according to claim 3, wherein the power receiving lead-in bushings of the three phases are inclined outward at equal angles in a range of 30 to 60 degrees from a vertical direction.

5. The gas-insulated switchgear according to claim 2, wherein the power receiving lead-in bushings of the three phases are inclined outward at equal angles in a range of 30 to 60 degrees from a vertical direction.

6. The gas-insulated switchgear according to claim 1, wherein the power receiving lead-in bushings of the three phases are inclined outward at equal angles in a range of 30 to 60 degrees from a vertical direction.

7. The gas-insulated switchgear according to claim 1, wherein the one of the power receiving lead-in bushings of the three phases is disposed along the front-rear direction of the main body portion such that the end portion of the one of the power receiving lead-in bushings is inclined in a frontward direction of the main body portion.

8. A gas-insulated switchgear, comprising:
a main body portion in which a switching device is housed, the main body portion having a front end and a rear end;
power receiving lead-in bushings of three phases to which conductor portions, arranged rearward of the main body portion, are connected, respectively; and
a bushing tank at which the power receiving lead-in bushings of the three phases are provided and in which a first insulating gas is sealed, bushing tank connection portions which are provided in the bushing tank and to which the power receiving lead-in bushings of the three phases are connected, wherein an upper surface portion of the bushing tank is formed as a hemispherical portion protruding upward, and the power receiving lead-in bushings of the three phases are provided at the hemispherical portion, and the power receiving lead-in bushings of the three phases are disposed on the upper surface portion of the bushing tank at equal intervals in a circumferential direction such that an end portion of each of the power receiving lead-in bushings is inclined outward so as to be separated from each other, and one of the power receiving lead-in bushings of the three phases is disposed along a front-rear direction of the main body portion, further comprising an intermediate tank, which is provided rearward of the main body portion, through which the conductor portions extended from the main body portion are extended in which a second insulating gas is sealed, and which has intermediate tank connection portions to which end portions of the conductor portions are connected, wherein the bushing tank connection portions and the intermediate tank connection portions are connected by cables.

9. The gas-insulated switchgear according to claim 8, wherein the one of the power receiving lead-in bushings disposed along the front-rear direction of the main body portion has the end portion inclined in a frontward direction of the main body portion.

10. The gas-insulated switchgear according to claim 8, wherein the power receiving lead-in bushings of the three phases are inclined outward at equal angles in a range of 30 to 60 degrees from a vertical direction.

11. The gas-insulated switchgear according to claim 8, wherein the intermediate tank connection portions and the bushing tank connection portions are connected to the cables in an open space.

12. The gas-insulated switchgear according to claim 11, wherein the main body portion is housed in a housing, and the intermediate tank and the bushing tank are disposed outside the housing.

13. The gas-insulated switchgear according to claim 9, wherein the power receiving lead-in bushings of the three phases are inclined outward at equal angles in a range of 30 to 60 degrees from a vertical direction.

* * * * *